(12) United States Patent
Nock et al.

(10) Patent No.: US 8,845,027 B2
(45) Date of Patent: Sep. 30, 2014

(54) EASY ENTRY RECLINER

(75) Inventors: Eckhard Nock, Schweitenkirchen (DE); Johannes Barzen, Pfaffenhofen (DE)

(73) Assignee: Lear Corporation, Southfield, MI (US)

( * ) Notice: Subject to any disclaimer, the term of this patent is extended or adjusted under 35 U.S.C. 154(b) by 341 days.

(21) Appl. No.: 13/356,855

(22) Filed: Jan. 24, 2012

(65) Prior Publication Data
US 2012/0217781 A1   Aug. 30, 2012

(30) Foreign Application Priority Data
Feb. 24, 2011   (DE) .......................... 10 2011 004 671

(51) Int. Cl.
| | |
|---|---|
| *B60N 2/235* | (2006.01) |
| *B60N 2/20* | (2006.01) |
| *B60N 2/12* | (2006.01) |

(52) U.S. Cl.
CPC ............... *B60N 2/20* (2013.01); *B60N 2/2356* (2013.01); *B60N 2/12* (2013.01)
USPC .................................................... 297/354.12

(58) Field of Classification Search
USPC .................................................... 297/354.12
See application file for complete search history.

(56) References Cited

U.S. PATENT DOCUMENTS

| | | | | |
|---|---|---|---|---|
| 6,106,067 | A  * | 8/2000 | Zhuang et al. ............. | 297/361.1 |
| 6,619,744 | B2 * | 9/2003 | Reubeuze ................ | 297/378.12 |
| 7,086,698 | B2 * | 8/2006 | Shiraki ...................... | 297/367 R |
| 7,328,954 | B2 * | 2/2008 | Sasaki et al. ............. | 297/378.12 |
| 7,490,907 | B2 * | 2/2009 | Nagura et al. ............. | 297/367 R |
| 7,686,398 | B2 * | 3/2010 | Yokoyama .................... | 297/341 |
| 8,430,454 | B2 * | 4/2013 | Tanguy et al. ............. | 297/367 L |
| 2010/0127546 | A1* | 5/2010 | Dziedzic ................... | 297/367 R |
| 2011/0127821 | A1* | 6/2011 | Wojatzki et al. ......... | 297/354.12 |
| 2011/0156462 | A1* | 6/2011 | Lim et al. ................. | 297/354.12 |
| 2011/0215626 | A1 | 9/2011 | Lehmann | |
| 2012/0228913 | A1* | 9/2012 | Hurst et al. .............. | 297/354.12 |

FOREIGN PATENT DOCUMENTS

| | | |
|---|---|---|
| DE | 69500344 T2 | 1/1998 |
| DE | 102008026176 A1 | 12/2009 |
| WO | WO 2009143999 * | 12/2009 ............. B60N 2/235 |

OTHER PUBLICATIONS

German Patent & Trademark Office, Office Action for the corresponding German Patent Application No. 10 2011 004 671.2 mailed Feb. 8, 2012.

* cited by examiner

*Primary Examiner* — David R Dunn
*Assistant Examiner* — Timothy J Brindley
(74) *Attorney, Agent, or Firm* — Brooks Kushman P.C.

(57) ABSTRACT

A recliner apparatus for a vehicle seat has a pair of discontinuous recliner mechanisms attached to opposite sides of the seat for comfort adjustment in which the angle of the seat back is moved to a desired angular orientation. A master easy entry recliner mechanism is attached to an inner side of one of the side support members of the vehicle seat frame. A locking pawl is operatively connected to the side support member to selectively engage a stop in a locked position. The locking pawl is moved by a control cable between locked and unlocked positions. A slave easy entry connector is connected to the master easy entry recliner mechanism by a slave control cable. The slave easy entry connector releases one of the discontinuous recliner mechanisms when the master easy entry recliner is shifted to the easy entry position.

16 Claims, 5 Drawing Sheets

EASY ENTRY RECLINER

CROSS-REFERENCE TO RELATED APPLICATIONS

This application claims foreign priority benefits under 35 U.S.C.§119(a)-(d) to DE 10 2011 004 671.2, filed Feb. 24, 2011, the disclosure of which is hereby incorporated by reference in its entirety.

TECHNICAL FIELD

The present invention relates to seat back reclining mechanisms that cooperate with an easy entry seat release mechanism.

BACKGROUND

Seat reclining mechanisms and easy entry seat release mechanisms are known and examples of prior art patents disclosing such devices include, but are not limited to, U.S. Pat. Nos. 5,611,599; 5,755,491; 5,536,217; 4,930,841; 4,668,013; 4,634,181; and 4,629,251.

SUMMARY

A recliner apparatus is provided for a vehicle seat that includes a seat base and a seat back that may be adjusted to change the angle of inclination of the seat back and that may also be released to permit easy entry to seats or storage areas located behind the vehicle seat.

In one embodiment of the recliner apparatus, right and left side discontinuous recliner mechanisms are attached to right and left side outer surfaces of the side support members forming the frame of the seat back. The right and left side recliner mechanisms are both secured to a shaft that is manually pivoted in one rotary direction to selectively release the recliner mechanisms for comfort adjustment in which the angle of the seat back is moved to a desired angular orientation. The shaft is pivoted in the opposite rotary direction to lock the seat back in the desired angular orientation. A master easy entry recliner mechanism is attached to an inner side of one of the side support members. The master easy entry recliner mechanism includes a locking pawl operatively connected to the side support member that engages a stop in a locked position. The locking pawl is moved by a principal control cable between the locked position in which the pawl locks the seat back to hold the seat back in the desired angular orientation and an unlocked position in which the pawl disengages the stop to unlock the seat back. In the unlocked position, the seat back is allowed to rotate to an easy entry position in which the seat back overlies the seat base. A slave easy entry connector is operatively connected to the master easy entry recliner mechanism by a slave control cable. The slave easy entry connector is released when the pawl is in the unlocked position. The slave easy entry connector is locked when the principal control cable is in the locked position. The slave easy entry connector releases one of the discontinuous recliner mechanisms when the master easy entry recliner mechanism is shifted to the easy entry position.

According to other aspects of the disclosure, the stop engaged by the locking pawl may be defined by a sector plate that has an arcuate surface that holds the pawl in the unlocked position while the slave control cable continues to hold the one discontinuous recliner mechanism in the released condition. The slave easy entry connector preferably releases the one discontinuous recliner before the pawl disengages the stop to unlock the seat back. The slave easy entry connector may be a lever that is attached to the shaft adjacent to the one discontinuous recliner mechanism. The lever comprising the slave easy entry connector pivots the shaft to release the one recliner mechanism. The lever may be attached to the one recliner mechanism on an outboard side of the recliner mechanism.

According to other aspects of the disclosure, a locking cam is provided that normally engages the locking pawl. A spring biases the locking cam to engage the locking pawl to hold the locking pawl in engagement with the stop. The principal control cable is actuated to move the locking cam into engagement with the locking pawl to disengage the stop.

According to another feature of the disclosure, a cover plate may be attached to the inner side of the side support member to which the master easy entry mechanism is attached. The locking pawl and locking cam are disposed between the cover plate and the side support member to which the easy entry recliner mechanism is attached. A dual lever having two arms with the first arm attached to the principal control cable and a second arm attached to the slave control cable is provided. The dual lever is connected to the locking cam to rotate the locking cam about a pivot axis.

These and other aspects of Applicants' disclosure will be better understood in view of the attached drawings and the following detailed description of the illustrated embodiments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
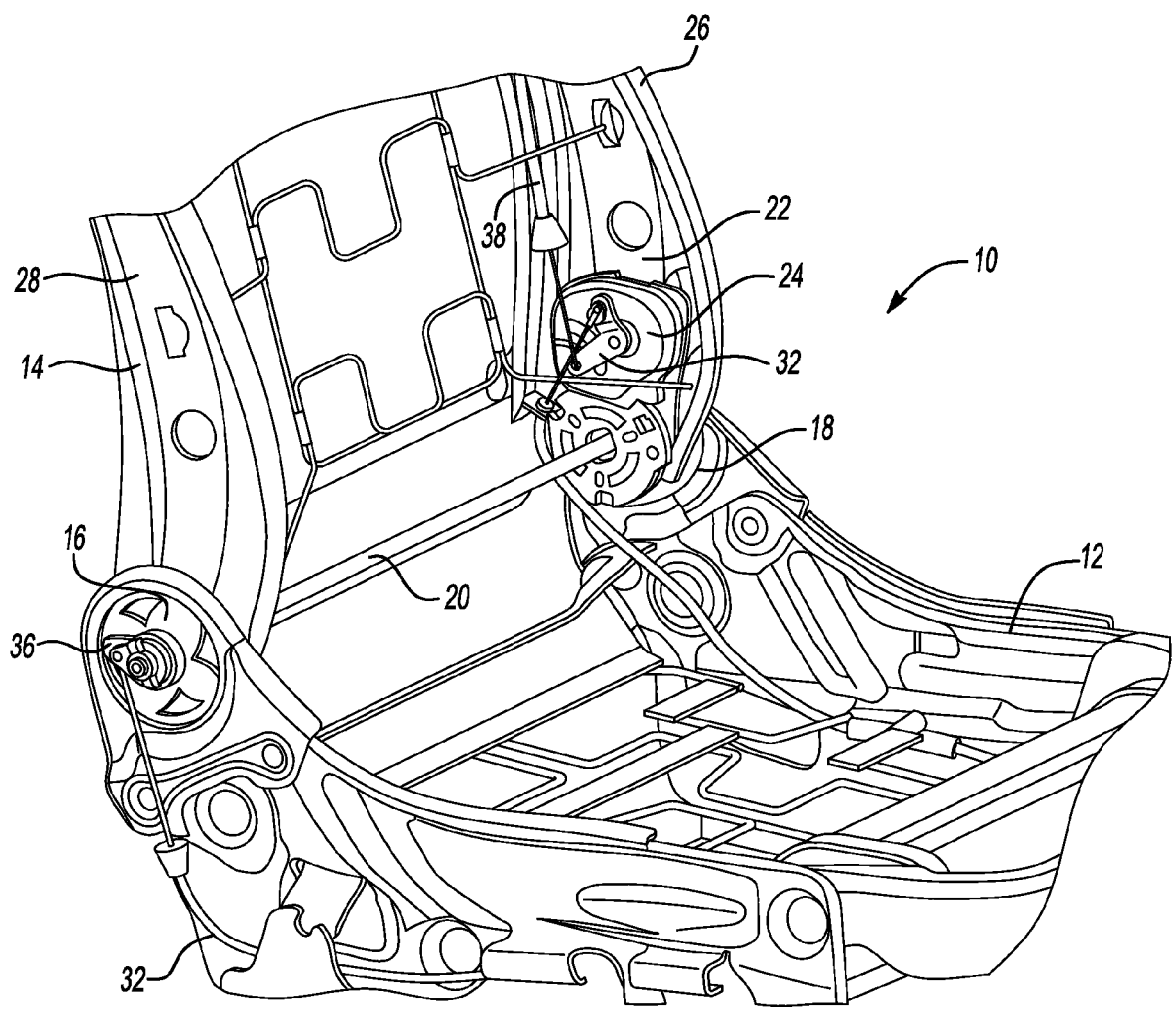
FIG. 1 is a fragmentary perspective view of a vehicle seat frame having a master easy entry recliner mechanism with two comfort recliners connected by a shaft.

Referring to FIG. 1, a vehicle seat 10 is shown with the cushions and cover removed to reveal a seat base frame 12 and a seat back frame 14. A right discontinuous recliner 16 and a left discontinuous recliner 18 are connected by a shaft 20 to provide a pivot connection between the seat back frame 14 and the seat base frame 12. On an inside surface 22 of the seat back frame 14, a master easy entry recliner 24 is secured. The master easy entry recliner 24 is secured to the inside surface 22 to avoid interference with seat back mounted air bag structures (not shown) that may be attached to the seat back frame 14. A left side support member 26 and a right side support member 28 are the main vertical support portions of the seat back frame 14.

A principal control cable 30 extends from an actuator (not shown), such as a handle, located at the upper portion of the seat back frame 14 that is manipulated by a vehicle occupant to release the easy entry recliner 24. The principal control cable 30 extends to a dual lever 32 that is used to release the master easy entry recliner 24. The dual lever 32 also is connected to a slave control cable 34. The slave control cable 34 is routed from the master easy entry recliner 24 to a slave connector 36. The slave connector 36 is connected to the right discontinuous recliner 16 to release the right discontinuous recliner 16 when the master easy entry recliner 24 is released.

The right discontinuous recliner 16 is preferably released by the slave connector 36 before the master easy entry recliner 24 is released. This may be accomplished by reducing the extent of cable movement necessary to release the slave connector 36 so that it is less than the range of motion required to release the master easy entry recliner 24.

Figure 2:
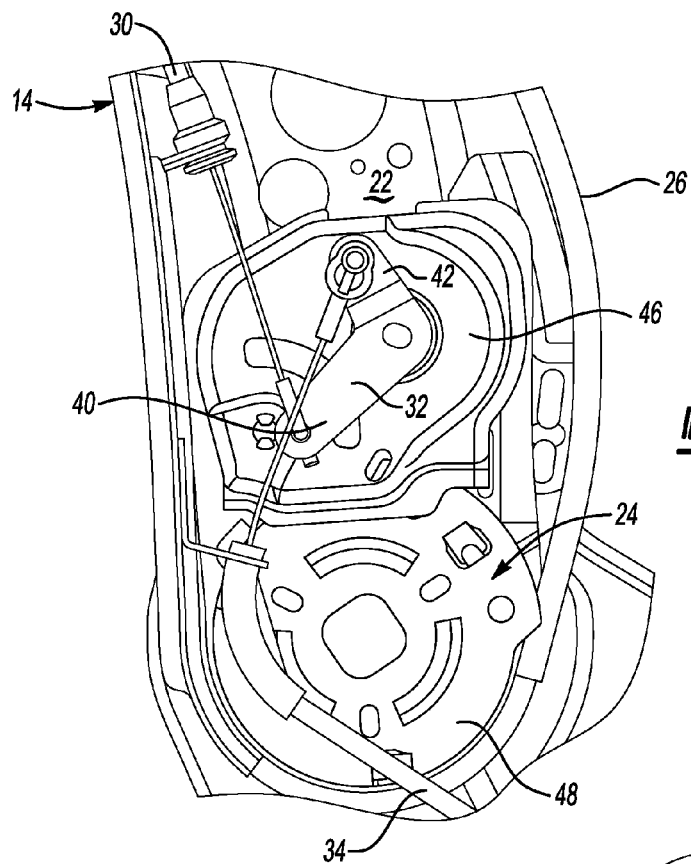
FIG. 2 is a fragmentary side elevation view of the master easy entry recliner mechanism.

Referring to FIG. 2, a portion of a seat back frame 14 is shown to include the inside surface 22 of the left side support member 26. The principal control cable 30 is connected to the dual lever 32. The principal control cable is connected to a first leg 40 of the dual lever 32. The slave control cable 34 is connected to a second leg 42 of the dual lever 32. When the principal control cable 30 is actuated, the cable pulls the first leg 40 upwardly, as shown in FIG. 2, so that the dual lever 32 rotates in a clockwise direction. This movement causes the second leg 42 to pull the slave control cable 34.

A cover 46 encloses the master easy entry recliner 24 to isolate it from the foam cushion and other portions of the vehicle seat (not shown). A sector plate 48 is also shown in FIG. 2 that forms part of the master easy entry recliner 24 as will be more particularly described with reference to FIGS. 3-5 below.

Figure 3:
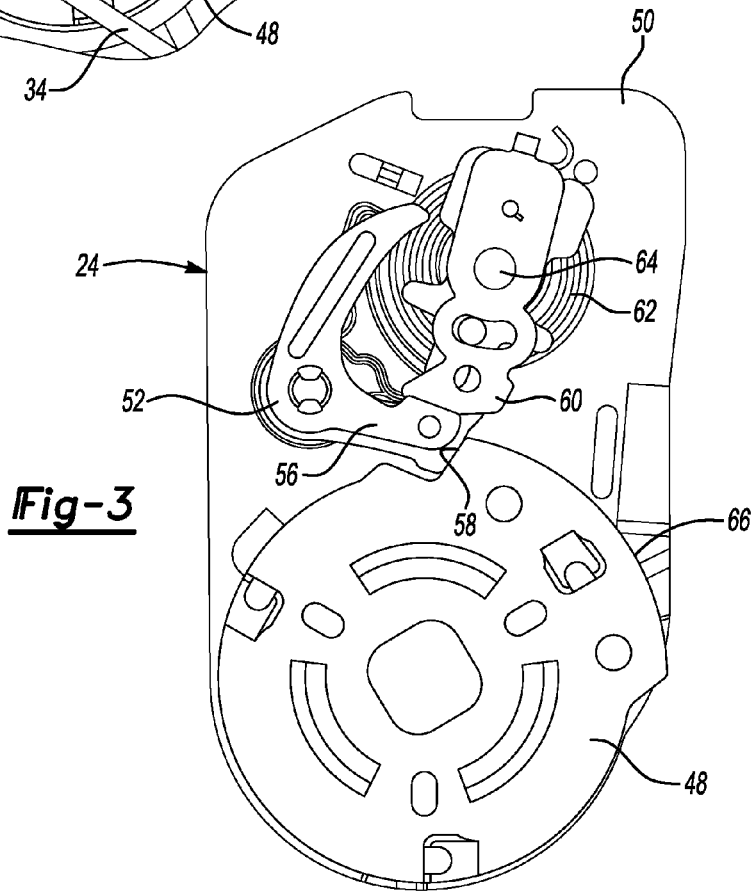
FIG. 3 is a side elevation view of the master easy entry recliner with its cover removed in the locked position.
Figure 4:
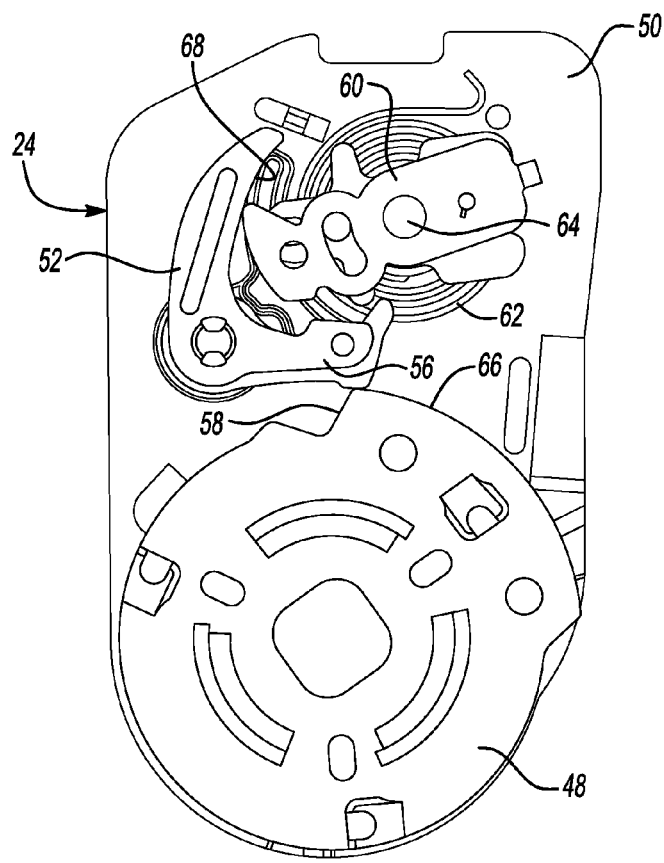
FIG. 4 is a view similar to FIG. 3 showing the easy entry mechanism as it is initially unlocked.
Figure 5:
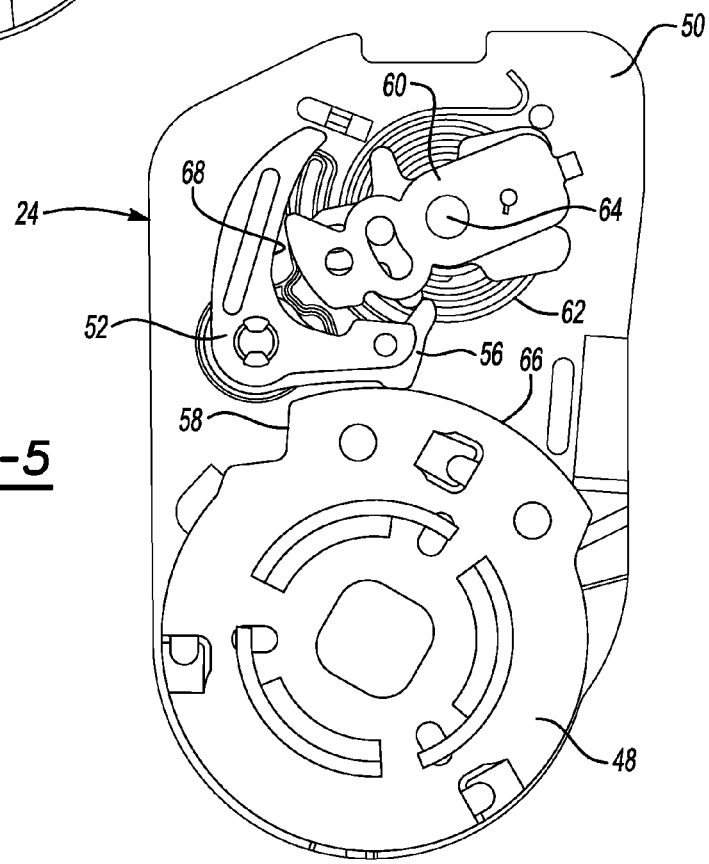
FIG. 5 is a view similar to FIGS. 3 and 4 showing the master easy entry recliner in its unlocked position with the seat back partially rotated in the forward direction.

Referring to FIGS. 3-5, the master easy entry recliner 24 is shown in greater detail. The master easy entry recliner 24 may be assembled to a plate 50 so that it can be attached as a subassembly to the inside surface 22 (shown in FIG. 2) of the left side support member 26 (shown in FIG. 2). A locking pawl 52 is pivotally connected to the plate 50. The locking pawl 52 includes a locking lever 56 that is adapted to engage a stop 58 that forms part of the sector plate 48.

A locking cam 60 cooperates with the locking lever 56 as will be shown in the series of views comprising FIGS. 3-5. The locking cam 60 initially holds the locking lever 56 in engagement with the stop 58. A spring 62 biases the locking cam 60 into the position shown in FIG. 3. The locking cam 60 is mounted on a pivot pin 64 that pivots about an axis. An arcuate surface 66 is provided on the sector plate and holds the locking lever 56 in a disengaged position as will be more particularly described with reference to FIGS. 4 and 5 below.

Referring to FIG. 4, the locking lever 56 is shown just after disengaging the stop 58 formed on the sector plate 48. The locking lever is permitted to move when the locking cam 60 is rotated by the dual lever 32 as a result of actuation of the principal control cable 30. The locking cam 60 rotates the locking lever 56 by engaging the inner surface 68 of the locking lever 56. As shown in FIG. 4, the locking lever 56 is clear of the stop 58 and beginning to engage the arcuate surface 66 of the sector plate 48.

Referring to FIG. 5, forward folding of the master easy entry recliner 24 is shown. The locking lever 56 is shown riding upon the arcuate surface 66. At this point, the seat back is permitted to rotate from its angularly adjusted comfort position to its full forward, or easy entry position. The sector plate 48 is secured to the right discontinuous recliner 16 and the seat back (shown in FIGS. 1 and 2) is permitted to fold forward free of the left discontinuous recliner 18 shown in FIGS. 1 and 2.

Figure 6:
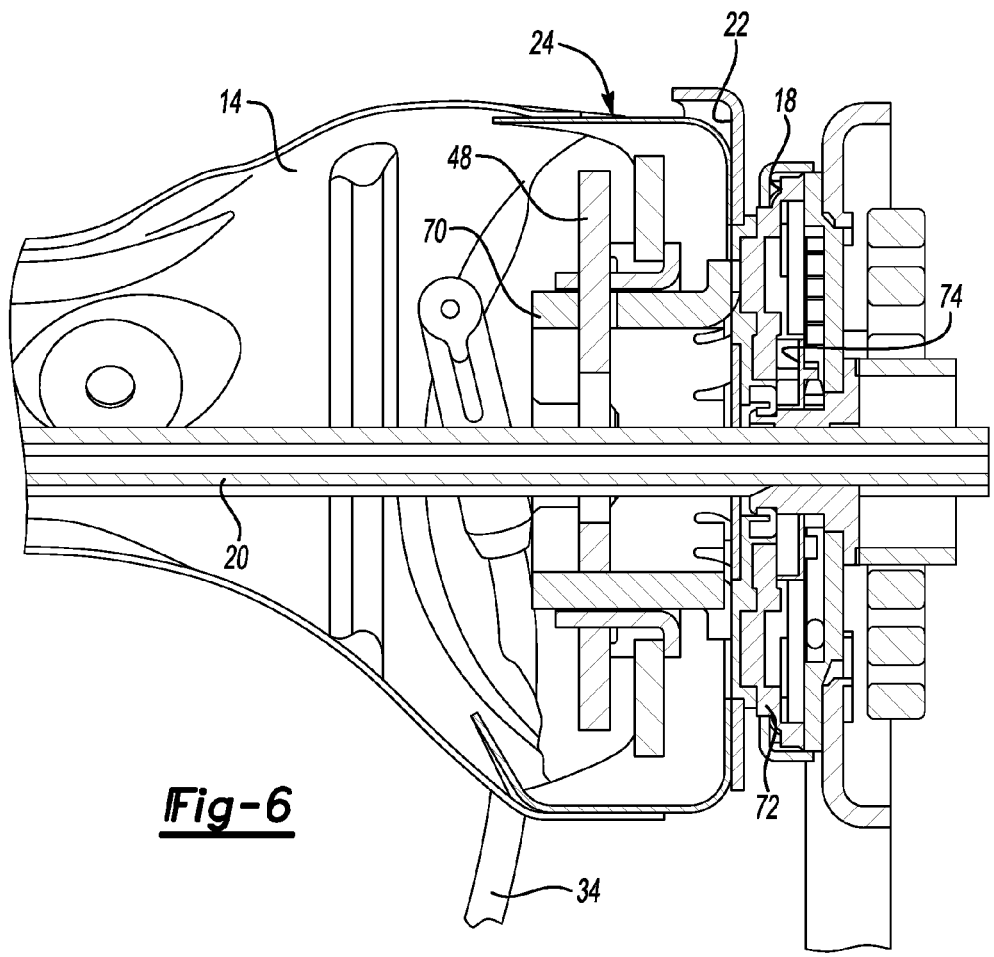
FIG. 6 is a fragmentary cross-sectional view of the master easy entry recliner shown connected to a discontinuous comfort recliner.

Referring to FIG. 6, the lower part of the master easy entry recliner 24 is shown in conjunction with a portion of the seat back frame 14. The master easy entry recliner 24 includes a collar 70 that is fixedly secured to an inner gear plate 72 of the left discontinuous recliner 18. The inner gear plate 72 cooperates with a guide plate 74 to provide comfort adjustment for the angular orientation of the seat back 14. The collar 70 supports the sector plate 48 and is not connected to the shaft 20 so that the seat back may be positioned in the easy entry position without requiring the disengagement of the left discontinuous recliner 18. The master easy entry recliner 24 is attached to the inside surface 22 of the left side support member 26, as previously described.

Figure 7:
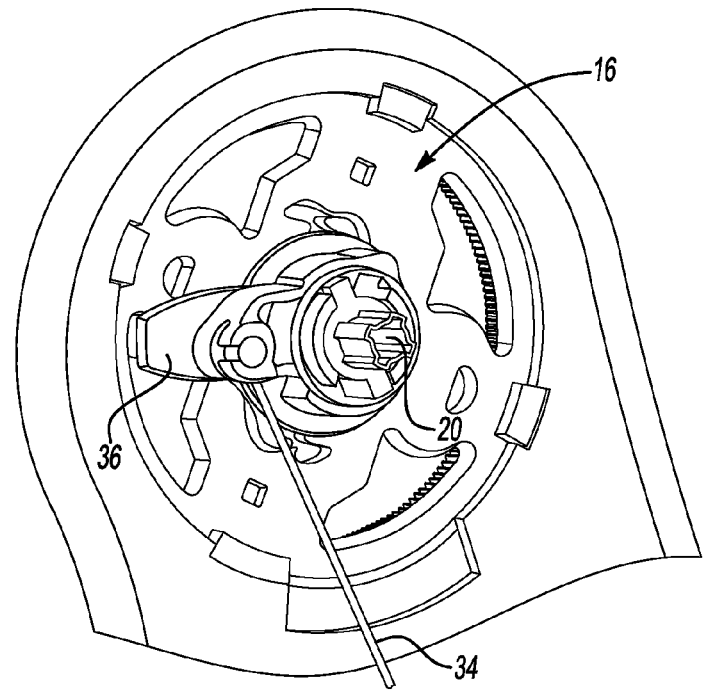
FIG. 7 is a fragmentary side elevation view of a slave connector connected to one of the discontinuous comfort recliner mechanisms.

Referring to FIG. 7, the right discontinuous recliner 16 is generally shown connected to a portion of the shaft 20. The slave control cable 34 is connected to a slave connector 36 comprising a lever arm that is rotated in a counter-clockwise direction, as shown in FIG. 7, to release the right discontinuous recliner 16.

Figure 8:
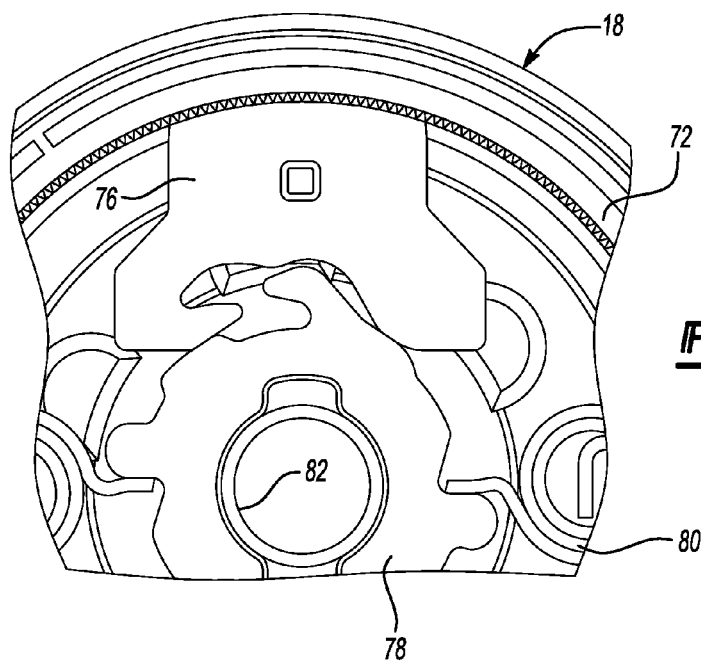
FIG. 8 is a fragmentary side elevation view of a discontinuous recliner locking cam and pawl in the locked position.
Figure 9:
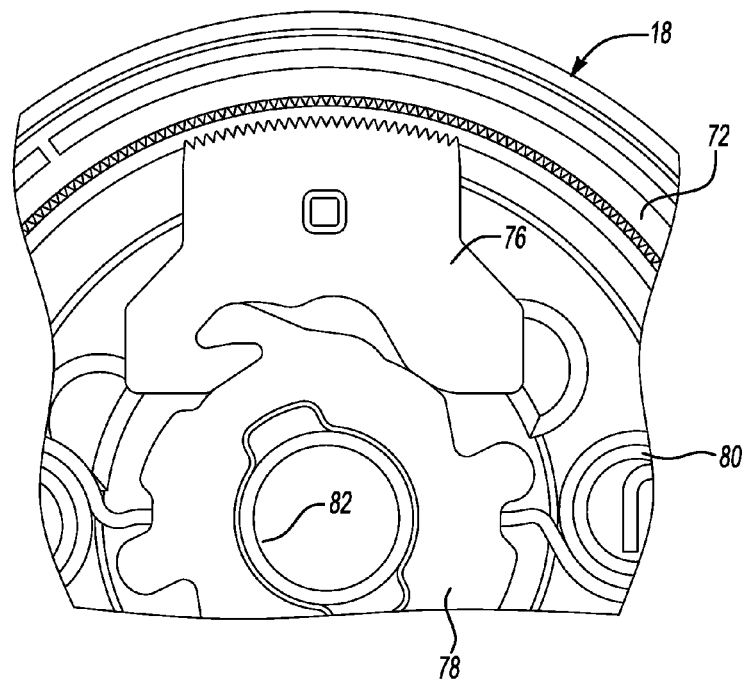
FIG. 9 is a fragmentary side elevation view of a discontinuous recliner locking cam and pawl in the unlocked position.

Referring to FIGS. 8 and 9, the structure of the discontinuous recliners 16 and 18 is shown in a fragmentary view. The discontinuous recliners each include an inner gear plate 72 that cooperates with the guide plate 74 (shown in FIG. 6). A pair of locking elements 76 engage the inner gear plate 72 to hold the seat back (shown in FIGS. 1 and 2) in a selected, or desired, angular orientation relative to the seat base 12 (shown in FIGS. 1 and 2). A cam 78, as shown in FIG. 8, holds the locking element 76 into engagement with the inner gear plate 72. The cam 78 is biased by a spring 80 into its locked position. A hub 82 is also shown in FIG. 8 that connects the cam 78 to the shaft 20 (shown in FIGS. 1 and 6).

Referring to FIG. 9, the discontinuous recliner 18 is shown in its released position in which the seat back 14 may be moved to a desired angular orientation while the locking element 76 is withdrawn by the cam 78 as it is rotated by the hub 82. In this position, the biasing force exerted by the spring 80 is overcome by either rotation of the shaft 20 through the left discontinuous recliner 18 by a handle (not shown). Alternatively, the slave connector 36 may be shifted by the slave control cable 34 to release the right discontinuous recliner (shown in FIG. 1) when the master easy entry recliner 24 is released by the principal control cable 30.

In operation, the angular position of the seat back frame 14 is adjusted by disengaging the right and left discontinuous recliners 16, 18 by actuating a handle on one side of the vehicle seat. As used herein, the right and left directions are used in the context of a left side drive vehicle driver seat. As is well known in the art, a passenger side seat would have the right and left sides reversed due to the need to provide a handle on the opposite side of the seat.

The easy entry function is provided by the cooperation of the master easy entry recliner 24 that operates the slave connector 36. The master easy entry recliner 24 is actuated when the principal control cable 30 is pulled to rotate the dual lever 32. At the same time, the slave control cable 34 is shifted to rotate the slave connector 36. The master easy entry recliner 24 acts on the left side support member of a driver's seat in a left-hand side drive vehicle. The slave connector acts upon the right discontinuous recliner 16 of such a seat. The master easy entry recliner 24 is released when the locking pawl 52 and its associated locking lever 56 disengage the stop 58 formed on the sector plate 48. The seat back is then free to pivot to a forwardly shifted position in which the seat back frame 14 overlies the seat base frame 12. The locking lever 56 is prevented from locking as it rides over the arcuate surface 66 of the sector plate 48.

When the seat is returned to its upright position, the sector plate 48 rotates relative to locking lever 56 until the locking lever 56 again engages the stop 58. Since there has been no change in the angular orientation of the left discontinuous recliner 18, the seat back is returned to its original comfort position which may be referred to as an easy entry with memory recliner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat comprising:
   a seat base;
   a seat back pivotally secured to the seat base, the seat back having a frame that includes a right side support member and a left side support member;
   a right side discontinuous recliner mechanism attached to a right side outer surface of the right side support member and a left side discontinuous recliner mechanism attached to a left side outer surface of the left side support member, wherein the right and left side recliner mechanisms are secured to a shaft that is manually pivoted to selectively release the recliner mechanisms for comfort adjustment in which the angle of the seat back is moved to a desired angular orientation and the shaft is released to lock the seat back in the desired angular orientation;
   a master easy entry recliner mechanism attached to an inner side of one of the side support members and is attached through the side support member to which it is attached and that is also attached to one of the first discontinuous recliner mechanisms, the master easy entry recliner mechanism includes a locking pawl operatively connected to the side support member that selectively engages a stop in a locked position;
   a locking cam that normally engages a first surface of the locking pawl, and a spring that biases the locking cam to engage the locking pawl to hold the locking pawl in engagement with the stop, wherein a principal control cable is actuated to move the locking cam into engagement with a second surface of the locking pawl to disengage the locking pawl from the stop, wherein the locking pawl is moved between the locked position in which the pawl locks the seat back to hold the seat back in the desired angular orientation and an unlocked position in which the pawl disengages the stop to unlock the seat back to rotate to an easy entry position overlying the seat base; and
   a slave easy entry connector is operatively connected to the master easy entry recliner mechanism by a slave control cable, the slave easy entry connector is released when the pawl is in the unlocked position, wherein the slave easy entry connector releases the discontinuous recliner mechanism that the master easy entry recliner is unattached to when the master easy entry recliner mechanism is shifted to the easy entry position.

2. The vehicle seat of claim 1 wherein the stop is defined by a sector plate that has an arcuate guide surface that holds the pawl in the unlocked position while the slave control cable continues to release the second discontinuous recliner mechanism.

3. The vehicle seat of claim 2 wherein the slave easy entry connector releases the second discontinuous recliner before the pawl disengages the stop to unlock the seat back.

4. The vehicle seat of claim 1 wherein the slave easy entry connector is a lever that is attached to the shaft adjacent to the second discontinuous recliner mechanism.

5. The vehicle seat of claim 4 wherein the lever pivots the shaft to release the second recliner mechanism.

6. The vehicle seat of claim 5 wherein the lever is attached to the second recliner mechanism on an outboard side of the second recliner mechanism.

7. The vehicle seat of claim 1 further comprising a cover plate attached to the inner side of the one side support member to which the master easy entry recliner mechanism is attached with the locking pawl and the locking cam being disposed between the cover plate and the one side support member to which the master easy entry recliner mechanism is attached.

8. The vehicle seat of claim 7 further comprising a dual lever having two arms with a first arm attached to the principal control cable and a second arm attached to the slave control cable, the dual lever being connected to the locking cam to rotate the locking cam about a pivot axis.

9. A recliner apparatus for a vehicle seat including a seat base, a seat back pivotally secured to the seat base, the seat back having a frame that includes a right side support member and a left side support member, the recliner comprising:
   a right side discontinuous recliner mechanism attached to a right side outer surface of the right side support member and a left side discontinuous recliner mechanism attached to a left side outer surface of the left side support member, wherein the right and left side recliner mechanisms are secured to a shaft that is manually pivoted to selectively release the recliner mechanisms for comfort adjustment in which the angle of the seat back is moved to a desired angular orientation and the shaft is released to lock the seat back in the desired angular orientation;
   a master easy entry recliner mechanism attached to an inner side of one of the side support members, the master easy entry recliner mechanism including a locking pawl operatively connected to the side support member that selectively engages a stop in a locked position;
   a locking cam that normally engages a first surface of the locking pawl, and a spring biases the locking cam to engage the locking pawl to hold the locking pawl in engagement with the stop, wherein a principal control cable is actuated to move the locking cam into engagement with a second surface of the locking pawl to disengage the stop, wherein the locking pawl is moved between the locked position in which the pawl locks the seat back to hold the seat back in the desired angular orientation and an unlocked position in which the pawl disengages the stop to unlock the seat back to rotate to an easy entry position overlying the seat base; and a slave easy entry connector is operatively connected to the master easy entry recliner mechanism by a slave control cable, the slave easy entry connector is released when the pawl is in the unlocked position, wherein the slave easy entry connector releases one of the discontinuous recliner mechanisms when the master easy entry recliner mechanism is shifted to the easy entry position.

10. The recliner apparatus of claim 9 wherein the stop is defined by a sector plate that has an arcuate guide surface that holds the pawl in the unlocked position and the slave control cable continues to release the one discontinuous recliner mechanism.

11. The recliner apparatus of claim 9 wherein the slave easy entry connector releases the one discontinuous recliner before the pawl disengages the stop to unlock the seat back.

12. The recliner apparatus of claim 9 wherein the slave easy entry connector is a lever that is attached to the shaft adjacent to the one discontinuous recliner mechanism.

13. The recliner apparatus of claim 12 wherein the lever pivots the shaft to release the one recliner mechanism.

14. The recliner apparatus of claim 13 wherein the lever is attached to the one recliner mechanism on an outboard side of the one recliner mechanism.

15. The recliner apparatus of claim 9 further comprising a cover plate attached to the inner side of the one side support member to which the master easy entry recliner mechanism is attached with the locking pawl and the locking cam being disposed between the cover plate and the one side support member to which the master easy entry recliner mechanism is attached.

16. The recliner apparatus of claim 15 further comprising a dual lever having two arms with a first arm attached to the principal control cable and a second arm attached to the slave control cable, the dual lever being connected to the locking cam to rotate the locking cam about a pivot axis.

* * * * *